E. TATE
Hill-Side, Shovel and Sub-Soil Plow Combined.
No. 209,088. Patented Oct. 15, 1878.
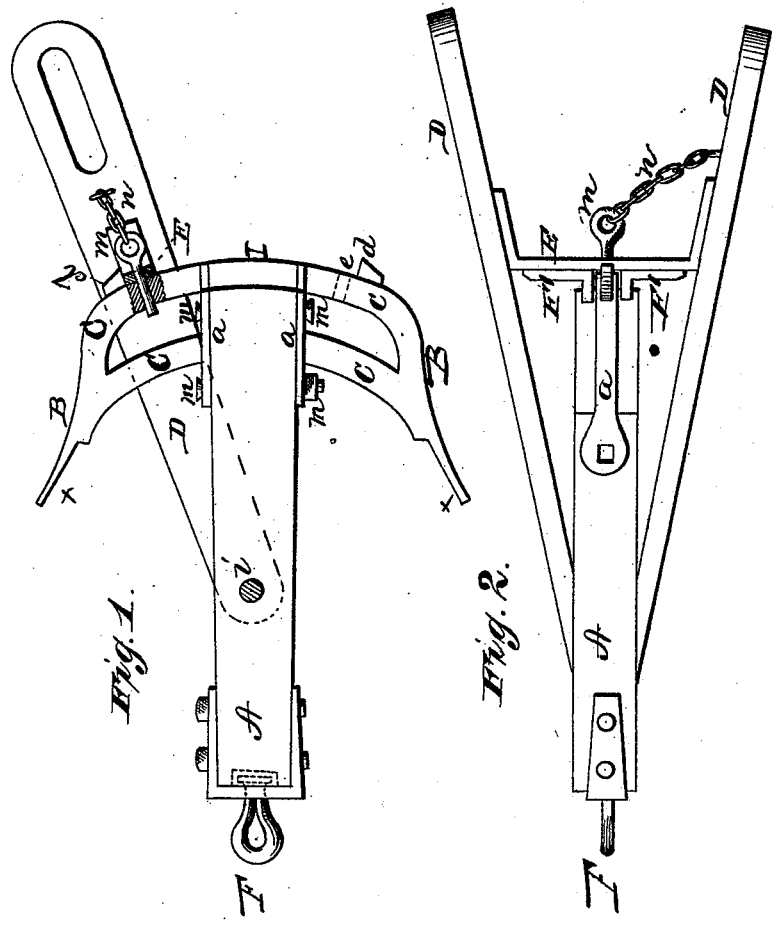

UNITED STATES PATENT OFFICE.

EDWARD TATE, OF JAMESTOWN, NORTH CAROLINA.

IMPROVEMENT IN HILL-SIDE, SHOVEL, AND SUBSOIL PLOW COMBINED.

Specification forming part of Letters Patent No. 209,088, dated October 15, 1878; application filed August 15, 1878.

*To all whom it may concern:*

Be it known that I, EDWARD TATE, of Jamestown, in the county of Guilford, and in the State of North Carolina, have invented certain new and useful Improvements in Hill-Side, Shovel, and Subsoil Plow Combined; and do hereby declare that the following is a full, clear, and exact description thereof, reference being had to the accompanying drawings, and to the letters of reference marked thereon, making a part of this specification.

The nature of my invention consists in the construction and arrangement of a reversible plow, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view, of my invention.

A represents the beam of the plow, having a clevis, F, swiveled in its front end, as shown.

D D are the handles, which are pivoted at their forward ends to the sides of the beam by a bolt, $i$, and connected to the plow-standards, as hereinafter described.

The beam A is provided with two plow-standards, B B, one on the upper and one on the lower side at the rear end. Each plow-standard B is composed of two curved bars, C C, which are welded together at their outer ends, forming a shouldered point, $x$, for the reception of the plow-blade. The inner ends of the two curved bars C C are welded to a plate or bar, $a$, which lies against the beam A, and is fastened thereto by bolts or their equivalents, $m$ $m$. Instead of welding the bars C to the plate or bar $a$ these parts may be united permanently together in any suitable manner.

The two handles D D are connected by an angle-bar, E, to which are secured two L-shaped bars, F' F', so arranged as to straddle the rear bar C of either plow-standard, and form, as it were, guides for the movement of the handles. The handles are held in place by means of a pin, $m$, passing through the bar E and through a hole, $e$, in the rear bar C of either plow-standard. On said rear bar of each plow-standard is formed a lug or projection, $d$, which acts as a stop for the handles to insure their coming in proper position for the insertion of the pin $m$.

In attaching the plow-standards B B to the beam A, the plates or bars $a$ $a$ are made to project sufficiently far beyond the rear end of the main part of the beam, and by forming on said rear end a tenon, I, there will be formed, as it were, a connection between the rear curved bars C C of the two plow-standards, of the same thickness as said bars, so as to allow the guides F' F' to pass from one to the other in reversing the plow. This plow is reversible, as is readily seen, and can be used for hill-sides, or as a subsoiler, or as an ordinary plow.

I am aware that reversible plows are not new, and I do not claim such, broadly, as my invention.

Having thus fully described my invention, what I claim as new, and desire to secure by Letters Patent, is—

1. In a reversible plow, the plow-standards B B, each consisting of the two curved bars C C, welded together at one end and to a plate or bar, $a$, at the other end, in combination with the beam A, having tenon I, for the purposes herein set forth.

2. The combination of the beam A, provided with the tenon I and swiveled clevis F, the plow-standards B B, provided with stops $d$ and holes $e$, the pivoted handles D D, with cross-bar E and guides F' F', and the pin $m$, substantially as and for the purposes herein set forth.

In testimony that I claim the foregoing I have hereunto set my hand this 16th day of July, 1878.

EDWARD TATE.

Witnesses:
C. M. ALEXANDER,
GEORGE H. GREGORY.